(12) United States Patent  (10) Patent No.: US 7,905,398 B1
Persaud et al.  (45) Date of Patent: Mar. 15, 2011

(54) CARD INCLUDING ACCOUNT NUMBER WITH VALUE AMOUNT

(75) Inventors: Omesh Persaud, Highlands Ranch, CO (US); Virgil Mathias, Parker, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 12/822,119

(22) Filed: Jun. 23, 2010

Related U.S. Application Data

(63) Continuation of application No. 12/634,587, filed on Dec. 9, 2009.

(60) Provisional application No. 61/240,171, filed on Sep. 4, 2009.

(51) Int. Cl.
*G06K 5/00* (2006.01)
(52) U.S. Cl. .................................... 235/380
(58) Field of Classification Search ............ 235/379, 235/380, 382, 383, 385, 449, 451, 492, 493
See application file for complete search history.

(56) References Cited

U.S. PATENT DOCUMENTS

| 6,193,155 | B1 | 2/2001 | Walker et al. |
| 7,252,226 | B2 | 8/2007 | Risafi et al. |
| 2003/0212796 | A1 | 11/2003 | Willard |
| 2007/0125842 | A1 | 6/2007 | Antoo et al. |
| 2009/0063345 | A1 | 3/2009 | Erikson |
| 2009/0271305 | A1 | 10/2009 | Lal |

FOREIGN PATENT DOCUMENTS

JP  08180168 A  *  7/1996

\* cited by examiner

*Primary Examiner* — Seung H Lee
(74) *Attorney, Agent, or Firm* — Kilpatrick Townsend & Stockton LLP (57) ABSTRACT

Embodiments of the invention disclosed herein provide a method of participating in prepaid programs through retail systems without the need to first upgrade their POS capabilities to participate, and allow for a merchant (retailer) to participate in proof of concept programs to determine if prepaid is a viable solution for their retail business model.

15 Claims, 9 Drawing Sheets

FIG. 5

CARD INCLUDING ACCOUNT NUMBER WITH VALUE AMOUNT

CROSS-REFERENCES TO RELATED APPLICATIONS

This application claims priority from U.S. Provisional Application No. 61/240,171, filed Sep. 4, 2009 and U.S. application Ser. No. 12/634,587, filed Dec. 9, 2009, both of which are herein incorporated in their entirety for all purposes.

BACKGROUND

Prepaid cards, gift cards, and other similar financial products (generally referred to herein as "portable consumer devices") are increasingly common in the retail and service industries. However, certain impediments and inconveniences of prepaid card systems present themselves. For example, the LOAD and ACTIVATE transactions conventionally used to fund and issue a prepaid card to the user and the point of sale (POS) terminals for issuing such prepaid cards are relatively new. Many merchant networks lack the ability to easily integrate these new transactions at the point of sale terminal without upgrading terminals or completely replacing these terminals. The additional investment in the network to allow loading and activation of prepaid cards at the POS can be a deterrent to the merchant or retailer wanting to participate in prepaid programs.

Consider, for example, a scenario where a large quick service restaurant (QSR) chain desires to pilot prepaid cards at its franchise restaurant locations. Suppose the QSR has hundreds of locations and desires to integrate prepaid cards in a short period of time, while wanting to reduce the time to market and the initial investment to create a pilot program. The pilot program could be used to determine if prepaid cards were a sufficiently viable product with the QSR's business model as to justify the time and money to proceed with a terminal upgrade and centralization of the POS (Point of Sale) system to support prepaid cards in the future.

An immediate upgrade to the POS system is not a practical solution given the cost and time constraints to bring the pilot program to market. Additionally, each franchise location for this particular QSR operates as an independent corporation in partnership with the QSR, with the independent franchise acquirers maintaining their own POS terminals and merchant acquirer relationship. Typically, the QSR is not able to control the acquirer and so a solution that works within the existing transactions and method of transaction processing infrastructure of the various acquirers is needed.

Another example is the inconvenience of having to manage a potentially large inventory of prepaid cards. Conventional prepaid cards are manufactured by the card manufacturer in fixed denominations. A card manufacturer prints indicia on the card that indicate the monetary amount. The text "$20" can be printed on the card to indicate a $20 value, or an image of a snowman might be printed on the card as a representation of the value of the card, and so on. Card issuers therefore are restricted, in practice, to limited numbers of denominations of prepaid cards. For example, a card issuer desiring to sell prepaid cards in $10 increments from $10 value cards to $1000 value cards would have to pre-order card stock for each of one hundred card denominations. This becomes a very expensive undertaking, and so the merchant or retailer is likely to order card stock in card denominations of only $25, $50, $100, for example, in order to keep his prepaid card inventory manageable. The lack of flexibility in specifying dollar value denominations in current conventional prepaid cards may be viewed as a limitation of the usefulness of prepaid cards.

These and other problems are addressed by embodiments of the invention, individually and collectively.

BRIEF SUMMARY

Embodiments of the invention allow a merchant (retailer) having an incompatible or older POS infrastructure to activate and load prepaid cards at a POS terminal using standard transaction sets. Embodiments of the invention therefore obviate the need for the merchant having to upgrade its terminal infrastructure and the need for POS terminals to be changed or replaced in order to support new prepaid card transactions.

An embodiment of the invention provides a portable consumer device comprising a plastic substrate having embossed on the substrate a primary account number (PAN). The PAN includes, among other information, a bank identification number (BIN) and a numeric value that indicates a monetary value associated with the portable consumer device.

An embodiment of the invention provides a method for adding value to a portable consumer device. A merchandise return transaction is used to indicate a monetary amount to be associated with the portable consumer device, thereby activating the portable consumer device. In a particular embodiment of the invention, an authorization request transaction is additionally performed to activate the portable consumer device.

An embodiment of the invention provides for distribution of stored-value (e.g., prepaid gift) cards, including receiving such cards from an issuing entity. Primary account numbers on the gift cards each includes a monetary value portion that indicates a funding amount of the gift card. Funding of the gift card includes scanning the card using a financial transaction device such as a POS terminal and initiating a merchandise return transaction.

These and other embodiments of the invention are described in further detail below.

DETAILED DESCRIPTION

Figure 1A:
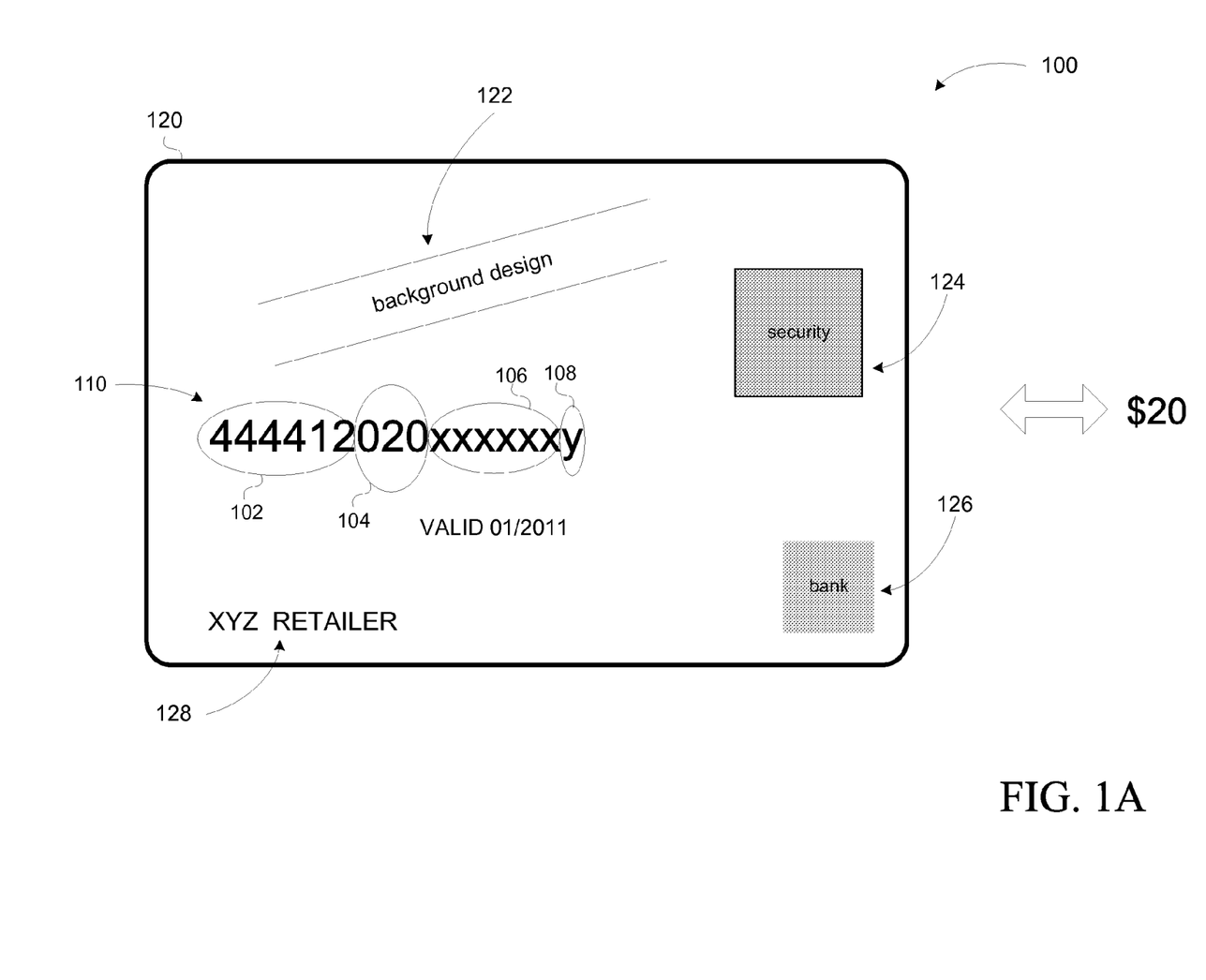
FIGS. 1A and 1B show illustrative examples of typical prepaid cards according to an embodiment of the invention.
Figure 1B:
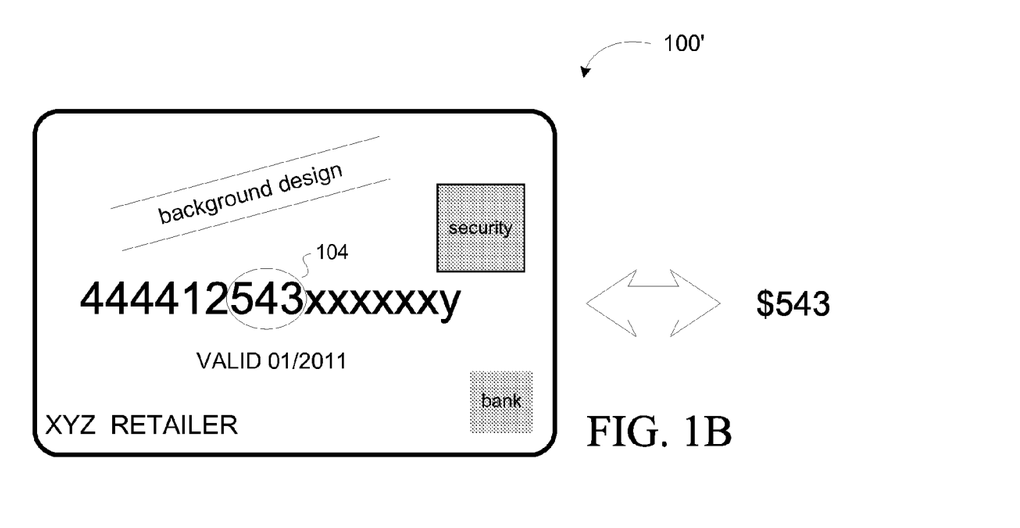

FIGS. 1A and 1B represent examples of prepaid cards in accordance with an embodiment of the invention. Referring to FIG. 1A, a prepaid card 100 is typically formed of plastic card stock (substrate) 120 with various indicia 122, 110, 128 that are embossed (impacted), printed, or otherwise presented on the card. A background design 122 can be printed on the card 100 as well. The card 100 may include a security emblem 124 to provide a measure of security against fraud. The card 100 may include a bank emblem 126 to identify the bank that issued the card. The bank is an example of an issuer (issuing bank, issuing entity, card issuer, etc.) of the card 100. A merchant name 128 or other identification is typically printed on the card 100 to identify the sponsoring merchant or merchants where the card can be used by the card holder (user, consumer, etc) to purchase items.

Figure 1C:
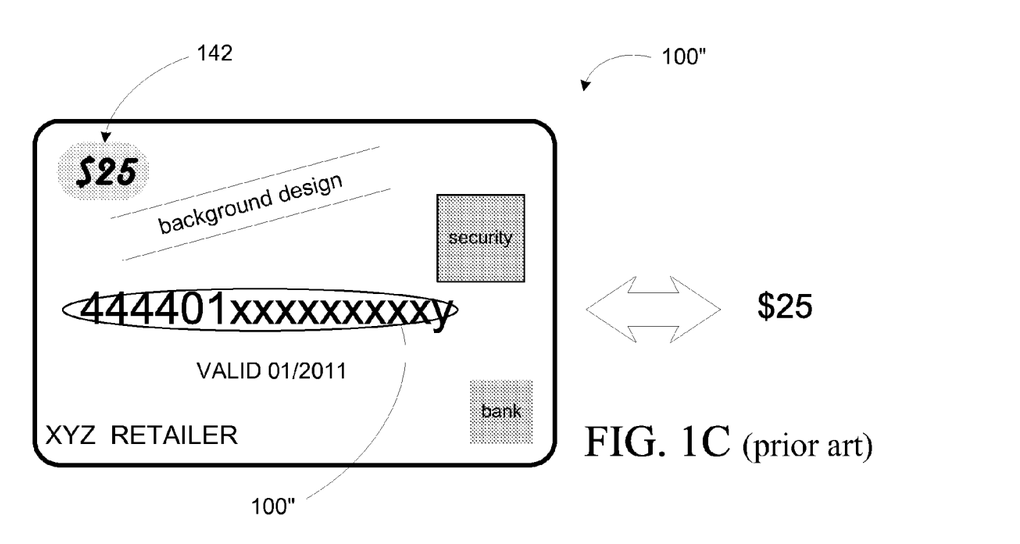
FIG. 1C illustrates a typical conventional prepaid card.

Referring for a moment to FIG. 1C, a typical conventional prepaid card 100" is represented. The figure shows a primary account number (PAN) 110" of the card, reproduce below, as:

$$\underset{BIN}{\underline{44401}} \underset{card\ number}{xxxxxxxxxy}$$

The PAN 110" is a number that is embossed and/or encoded on the card and serves to identify the issuer (e.g., a bank) and an account number, with the issuer, of an account that is associated with the prepaid card. The PAN 110" is typically a sixteen digit number, where the first six digits constitute a bank identification number (BIN) that identifies the issuer. The remaining ten digits constitute the card number, where nine digits (indicated by the nine "x"s) constitute an account number associated with the card and the last digit (indicated by "y") is a check digit.

In conventional prepaid cards, the ten digit card number generally has no meaning beyond identifying the account associated with the card, and certainly is not associated with any monetary value. The nine digit account number (indicated above by x's) is typically randomly generated and thus not representative of monetary value. The last digit is a check digit algorithmically determined based on the nine digits and thus is not associated with any monetary value. Instead, the monetary value of a conventional prepaid card is indicated by printing a suitable graphic on the face of the card. The conventional prepaid card example shown in FIG. 1C, for example, represents a prepaid card having associated with it a value of $25. As is conventionally practiced, the value of the prepaid card is indicated via a suitable graphic, such as an image 142 of the text "$25".

The card stock for prepaid cards typically originates from a card stock manufacturer. Among other things, the manufacturer may place a background design on the card and impacts the six-digit BIN of the issuing bank on the card. The cards are purchased by an entity called the personalization bureau ("personalizer"). The personalizer works with the issuer to print additional information such as expiration date, some additional graphics, and so on. In the case of portable consumer devices such as credit cards, the personalizer may also print the cardholder's name on the card. However, in the case of prepaid cards there are no cardholders initially and so cardholders' names are not printed. Instead, the name or logo of the merchant or merchants who sponsor the prepaid cards may be printed on the card. The personalizer under the direction of the issuing bank may also print a suitable graphic 142 (FIG. 1C) to indicate a load value (load amount) of the prepaid card. Initially, the prepaid card is not associated with a monetary amount. Rather, the prepaid card is funded (associated, loaded) with a monetary amount at the time it is sold to a consumer. The personalizer produces the cards in their final form for distribution to merchants for sale to consumers by printing the remaining ten digits of the PAN onto the card to create the full account number for the card. Each card has a different set of ten digits, determined by the issuing bank and given to the personalizer.

Returning to FIGS. 1A and 1B, the PAN 110 of a prepaid card 100 is typically sixteen digits in length. However, in accordance with the invention, the PAN 110 comprises an "extended BIN". The PAN 110 in FIG. 1A is shown below:

$$\underset{EXTENDED\ BIN}{\underline{444412020}} \underset{card\ number}{xxxxxxy}$$

In an embodiment, the extended BIN is nine digits in length and comprises three digits allocated from the conventional ten digit card number. The card number in embodiments of the invention is seven digits in length. The last digit in the card number (identified by "y") is a check digit.

The extended BIN includes the conventional six-digit BIN 102 plus a three-digit load value 104 that represents a predefined load value of the prepaid card when the card is activated. For example, the extended BIN illustrated in FIG. 1A is "44412020", where the first six digits "444412" constitute an identifier of the issuer. The additional three digits "020" represent the predefined load value (e.g., units of U.S. dollars in this example, though other units and/or currencies can be used). FIG. 1A therefore represents a prepaid card having a load value of $20. Similarly, FIG. 1B shows an example of a prepaid card 100' in accordance with the invention having a load value of $543.

FIG. 1B illustrates an example of an aspect of the invention, namely the load value can be any value between $1 and $999 in single dollar increments, and is not necessarily limited to larger increments such $10 increments or $100 increments as is typically the case with conventional prepaid cards, thus increasing the granularity with which the load value that can be specified. Embodiments of the invention can include load values having less the one dollar increments; e.g., 25¢ increments can be used. It can be further appreciated that the load value 104 can be greater or lesser in length; e.g., 4 digits long or 2 digits in length and so on. As can be appreciated, embodiments of the invention are directed to non-reloadable prepaid cards by virtue of the fact that the digits of the load value (e.g., "020", "543") are physically impacted on the card along with the other digits that comprise the PAN 110.

The sixteen digit PAN 110 in accordance with embodiments of the invention includes the extended BIN, a six-digit account number 106 positioned adjacent the extended BIN, and a check digit 108. The six-digit account number 106 indicated by the six "x"s, is the account associated with the prepaid card. The extended BIN, in turn, is nine digits and comprises the six-digit bank identifier 102 and a three digit load value 104 which constitutes the monetary value to be associated with the prepaid card 100. It is noted that the nine-digit entity is referred to as an "extended BIN" for convenience and as a reminder that the issuer (e.g., a bank) typically determines the load value of the prepaid card. The phrase "extended BIN" should not be construed to be a modification of the conventional six-digit bank identification number.

It is also noted that the placement of the three digits that constitute the load value 104 preferably, but not necessarily, immediately follows the six-digit bank identifier 102 and precedes the last seven digits of the PAN 110. A primary reason for the juxtaposition of the six-digit bank identifier 102 to the load value 104 is to avoid making it too easy for someone to predict the account numbers of the prepaid cards of the invention. For example, if the load value 104 is positioned at the end of the PAN 110, then the PANs of all $20 prepaid cards of the present invention would end with "020".

By positioning the load value 104 adjacent the six-digit bank identifier 102 within the PAN, as illustrated FIG. 1A, the detection becomes more difficult.

In accordance with the invention, an issuer of the prepaid card works with the personalization bureau to specify the three-digit load value 104, in addition to the typical personalization information such as merchant name, expiration date, and so on. Thus, as an example, the issuer might instruct the personalizer to produce 100 cards having a load value of $10, to produce 500 cards having a load value of $20, to produce 500 cards having a load value of $300, and to produce 200 cards having a load value of $900. Since the issuer is the entity that specifies to the personalizer the ten-digit card numbers for conventional prepaid cards, it is a simple matter to specify a similar set of ten digits to the personalizer to make prepaid cards in accordance with the invention. For example, for prepaid cards in accordance with the invention having a $10 load value, the issuer will generate ten-digit numbers that begin with "010." Likewise, the issuer will generate ten-digit numbers that begin with "020" for its $20 prepaid cards, and so on. The personalizer can then print the following prepaid cards:

prepaid cards with predenominated load amounts of $10.00: 444412010xxxxxxy prepaid cards with predenominated load amounts of $20.00: 444412020xxxxxxy prepaid cards with predenominated load amounts of $300.00: 444412300xxxxxxy prepaid cards with predenominated load amounts of $900.00: 444412900xxxxxxy where the "xxxxxx" represent specific account numbers associated with the prepaid cards of the invention.

Further in accordance with the invention, a suitable numbering convention is applied to the bank identification number so that conventional prepaid cards can be distinguished from prepaid cards in accordance with the invention. For example, XYZ Bank may be associated with the following bank identification numbers: 444410, 444411, and 444412. The BINs "444410" and "444411" might be used for conventional cards (e.g., credit, debit, prepaid), where the ten-digit card number portion identifies the account number associated with the card. However, the BIN "444412" can be specially designated by the issuer to signify that this is a prepaid card according to the invention. When the issuer receives a transaction for a card with a BIN of "444412", it will know that the transaction is for a prepaid card of the invention. The issuer will also know how to parse the ten digits that follow the BIN. More specifically, the issuer will know that the first three digits of the ten digits that follow the BIN represent the load value 104 and that the remaining seven digits 106 (FIG. 1A) identifies the account associated with the card.

Figure 2A:
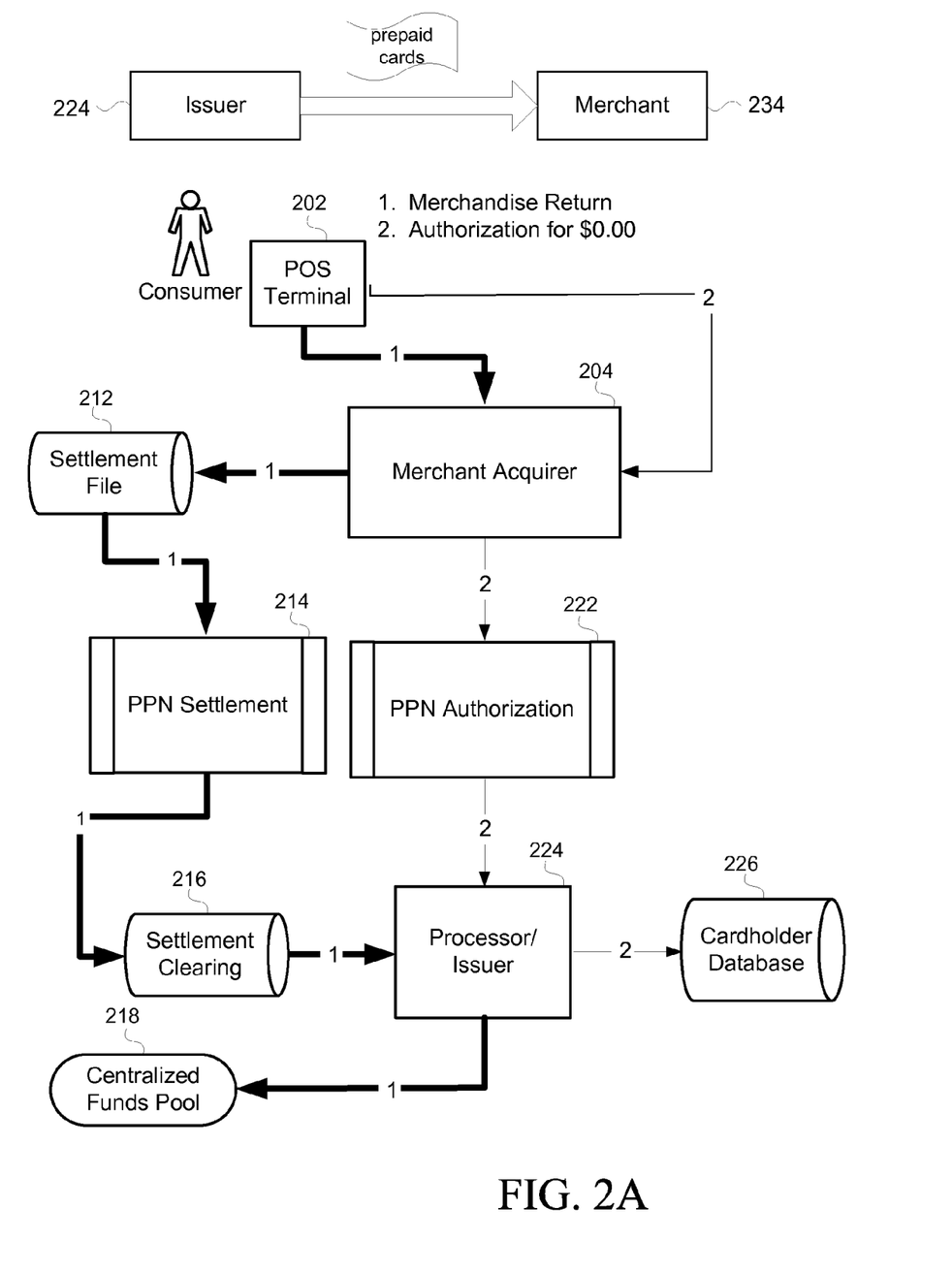
FIGS. 2A and 2B illustrate a "merchandise return" transaction flow used as part of the process of funding a prepaid card in accordance with the invention.
Figure 2B:
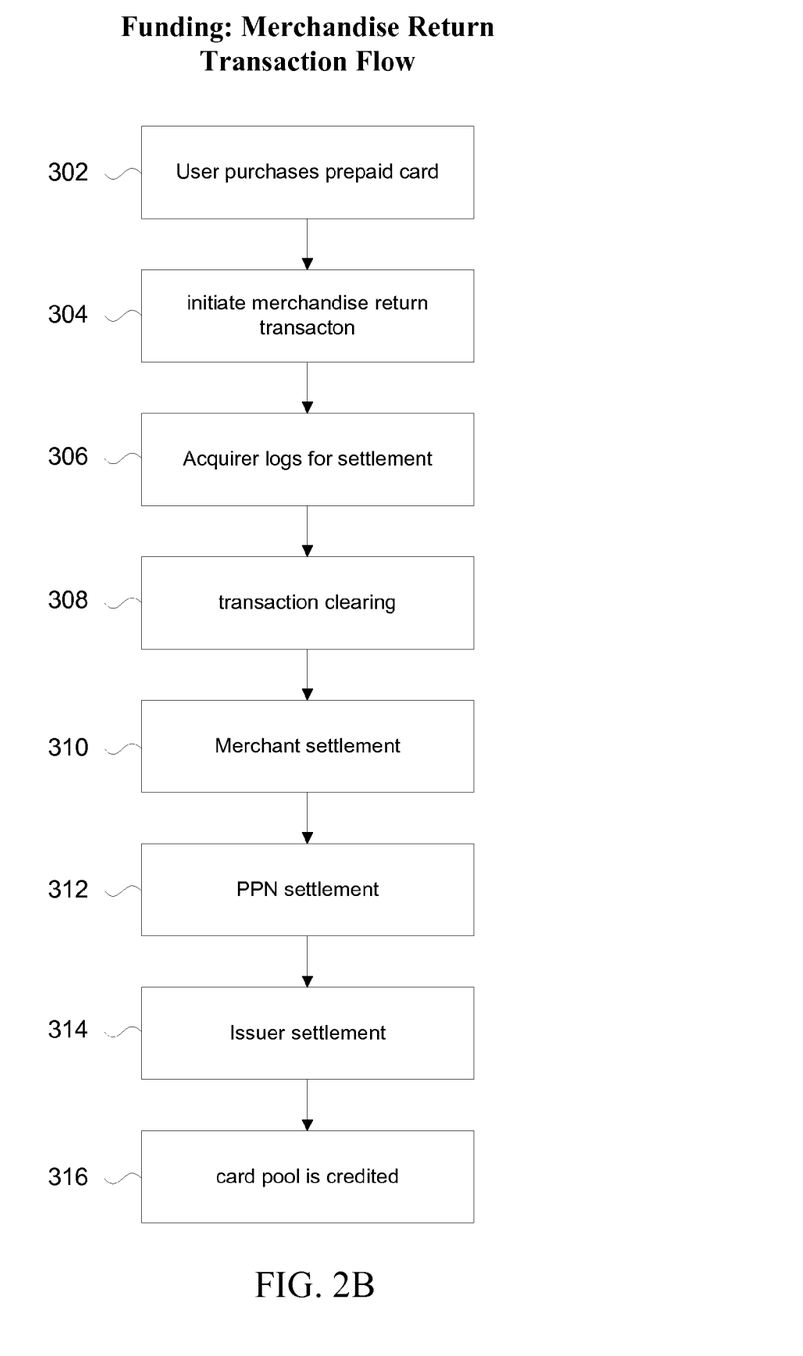

Refer now to FIGS. 2A and 2B for a discussion of the process for loading value onto a prepaid card using a merchant's payment system in accordance with the invention. A merchant 234 obtains prepaid cards according to the invention from an issuer 224 (typically through a personalizer as explained above). The transaction network includes a point of sale (POS) terminal 202 located at the merchant's establishment where the sale of a prepaid card to a consumer occurs. A merchant acquirer 204 is the financial institution (e.g., a bank) with which the merchant has an account for the purpose of acceptance, clearing, and settlement of the merchant's credit and debit card sales. It will be appreciated that the several elements shown in FIG. 2A can be interconnected by conventional data communication networks.

Settlement position information for transactions between the merchant 234 and the merchant acquirer 204 is typically recorded (logged) in a settlement file 212. The term "file" is used in a generic sense for storing settlement position information and, in any particular instance, may comprise one or more files or a system of files. The settlement file 212 can be maintained, for example, in a database or other suitable data system that may be managed by the merchant acquirer 204. A PPN settlement file 214 receives a copy of settlement positions from the settlement file 212 so that a "PPN" can calculate its settlement positions with the merchant 234. PPN is an acronym for "payment processing network" and is used herein to refer to an institution and its infrastructure for mediating financial transactions between an acquirer (e.g., 204) and an issuer (e.g., 224). In an embodiment of the invention, for example, the PPN may include Visanet. An element of the PPN infrastructure, for example, may include the PPN settlement file 214. Settlement positions in the PPN settlement file 214 are sent to a settlement clearing file 216 that is managed by the issuer 224.

A discussion of the flow shown in FIG. 2B and designated by "1" will now be made with reference to FIG. 2A. Suppose a consumer who desires to purchase a $20 prepaid card according to the invention (e.g., FIG. 1A) approaches the merchant 234. At step 302, the consumer (soon to be cardholder) pays a cashier of the merchant 234 an amount equal to $20. The cashier, at step 304, interacts with the POS terminal 202 (e.g., swipes or scans the prepaid card through the POS terminal) and enters a MERCHANDISE RETURN transaction code to initiate a MERCHANDISE RETURN transaction with the acquirer 204 to capture funds that need to be paid to the card issuer. A MERCHANDISE RETURN transaction code is the conventional transaction by which a purchased good or service is returned. As will become clear, the MERCHANDISE RETURN transaction is a mechanism by which the prepaid card can be funded in accordance with the invention. Since the notion of returning merchandise is practically universal, most merchant transaction systems are equipped with the ability to process MERCHANDISE RETURN transactions and so can be readily adapted in accordance with the invention to provide for the sale of prepaid cards.

Continuing with step 306, the merchant acquirer 204 receives the MERCHANDISE RETURN transaction code transmitted from the merchant 234. Associated with the code will be a return amount (i.e., $20) and the PAN 110 (e.g., FIG. 1A), having an extended BIN of "444412020". The amount is logged in the settlement file 212 for inclusion in settlement. In a particular example, the transaction is logged in a BASE II settlement file. The BASE II settlement file is a file structure used by the assignee of the invention for its clearing and settlement process. In other embodiments of the invention, it will be appreciated that the clearing and settlement process can employ other forms of settlement files and accounting systems. The BASE II file logs all the settlement positions of the acquirer 204, indicating how much the acquirer needs to collect from the issuer 224 (e.g., in the case of a purchase) and how much the acquirer needs to pay the issuer (e.g., in the case of a return).

Steps 308 and 310, at the end of the daily billing cycle, settlement processing begins. The settlement window closes and the acquirer 204 submits the BASE II settlement file, including the merchandise return transaction to the PPN for clearing, where it is stored in the PPN settlement file 214 for settlement calculation. The acquirer 204 settlement position is debited by $20 for the merchandise return transaction. The $20 debit to the merchant settlement is offset by the $20 received from the cardholder.

At step 312, the PPN calculates its settlement positions, including debiting the acquirer settlement in the amount of $20 for the $20 merchandise return transaction. Similarly at step 314, the settlement position for the issuer 224 is calculated and credited for $20 for the merchandise return transaction. The accounts are thus settled as follows: the merchant 234 owes its bank (the acquirer 204) $20, the acquirer owes the PPN $20, and the PPN owes the issuer 224 an amount of $20.

When the issuer 224 receives the settlement file 214 (e.g., BASE II file) from the PPN for clearing, the issuer will see a credit of $20 in its account resulting from the $20 MERCHANDISE RETURN transaction. The $20 MERCHANDISE RETURN transaction is received by the issuer 224. The extended BIN portion of the PAN (i.e., "444412020") will alert the issuer 224 that the transaction is being conducted for a prepaid card according to the invention by virtue of the specially designated BIN of "444412". The $20 in the MERCHANDISE RETURN transaction will therefore be treated by the issuer 224 as a LOAD transaction to load the prepaid card with a value of $20. The "020" in the extended BIN can be used to double-check with the $20 amount in the MERCHANDISE RETURN transaction. At step 316, the issuer 224 will credit the account of the prepaid card in the amount of $20, typically a centralized pool of funds 218 for funding prepaid cards.

When all the accounts are settled, each entity is made whole with respect to the $20 MERCHANDISE RETURN transaction: Thus, the consumer gives the merchant 234 $20 in return for receiving a $20-value prepaid card from the merchant. The merchant 234 initiates a MERCHANDISE RETURN transaction, resulting in the foregoing series of transactions in which the issuer 224 receives a credit from the PPN in the amount of $20. The issuer 224 credits the associated account for the prepaid card in the centralized funds pool 218 in the amount of $20 thus giving the prepaid card $20 in value. The issuer is made whole because of the $20 credited it just received from the PPN. The PPN, in turn is made whole because it receives $20 from the acquirer 204. The acquirer 204 is made whole because it will debit the merchant's 234 account with the acquirer in the amount of $20. Finally, the merchant 234 is made whole because it collected the payment of $20 from the consumer, now cardholder. The cardholder in turn receives a prepaid card which, at the funds pool 218, shows a loaded a value of $20.

Thus, it can be seen that the foregoing actions in accordance with the invention, utilizes an existing merchant transaction system in a novel and non-obvious manner to enable the merchant 234 to sell and load a non-reloadable prepaid card.

Some acquirers settle their accounts in real-time; i.e., the authorization and settlement occur in a single message. Such acquirers are aptly referred to as single message system (SMS) acquirers. For SMS acquirers, the MERCHANDISE RETURN transaction flows to the issuer in real-time. In other words, the acquirer computes and settles the transaction with the issuer right away, via the PPN which also computes and settles transactions in real-time. In an SMS environment, processing of a prepaid card according to the invention occurs in "real-time" in that the purchaser of the prepaid card can obtain a funded card at the time of purchase.

Many acquirers, however, typically do not conduct a merchandise return transaction in real-time with the issuer, but rather batch their merchandise return transactions in the various settlement files and settle their accounts on a 24-hour settlement window (or some other similar period of time). The embodiment illustrated in FIGS. 2A and 2B show an example of a "batched settlement" payment processing environment. In such a system, the issuer 224 is not likely to become aware of a prepaid card sale having taken place at the merchant 234 for a period of time until the closing of the settlement window. In order to ensure that the cardholder's newly purchased prepaid card is funded, a further aspect of the invention is to provide "real-time" funding of the prepaid card. The discussion will now turn to FIGS. 3A and 3B and an explanation of "real-time" funding of a prepaid card in a "batched settlement" payment processing environment in accordance with the invention.

Figure 3A:
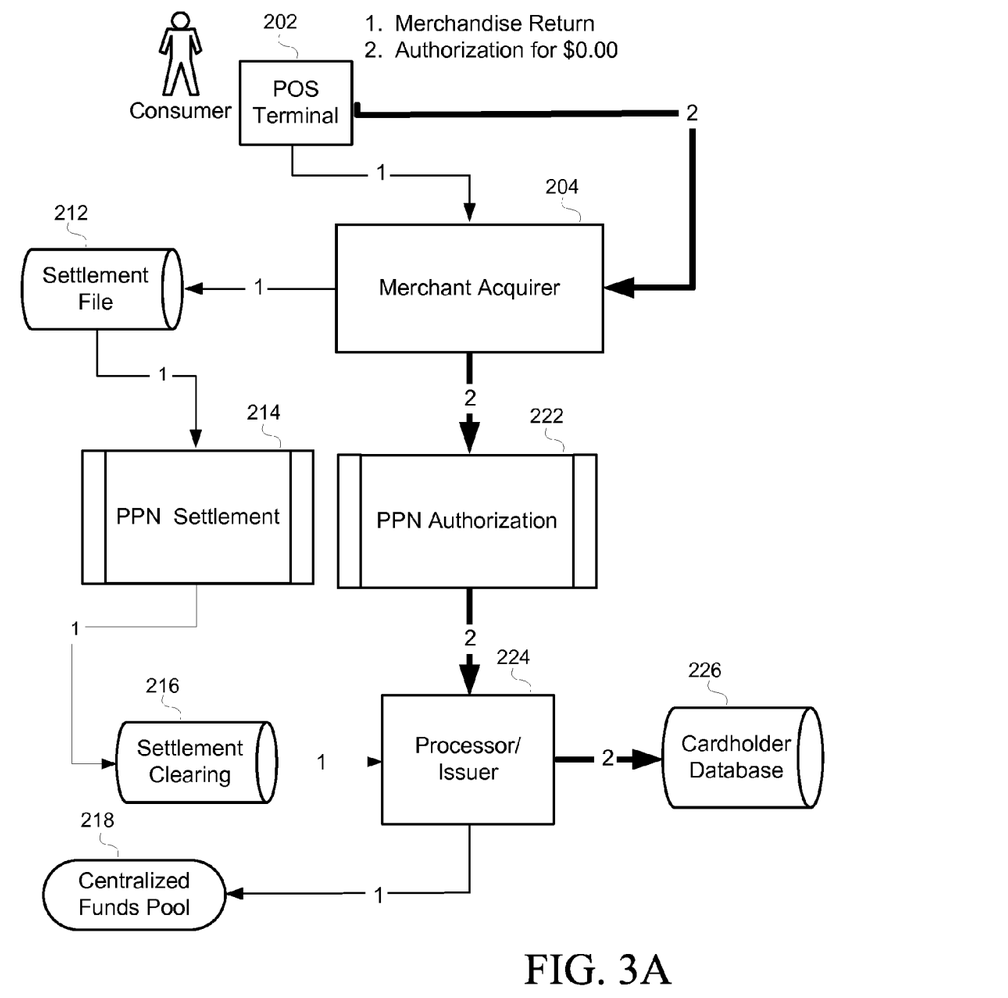
FIGS. 3A and 3B illustrate an "authorization" transaction flow used as part of the process of funding a prepaid card in accordance with the invention.

The flow in FIG. 2A designated by "2" is shown highlighted in FIG. 3A. The flow illustrates the processing for a transaction that is characterized by being settled in real-time, namely the AUTHORIZATION TRANSACTION. In accordance with an embodiment of the invention, the AUTHORIZATION TRANSACTION is used to alert the issuer 224 of the occurrence of a sale of a prepaid card of the invention to a consumer, thereby allowing the issuer to immediately fund the prepaid card.

In the specific example illustrated in FIG. 3A, an AUTHORIZATION TRANSACTION specifying an authorization amount of $0 is initiated by the merchant 234. After the merchant's cashier performs the MERCHANDISE RETURN transaction discussed above, the cashier can initiate a $0 AUTHORIZATION TRANSACTION, steps 332, 334, to notify the issuer 224 of the sale of the prepaid card.

When the merchant transmits the AUTHORIZATION TRANSACTION, the transaction flows to the acquirer 204 and then to the PPN and then to the issuer 224 in real-time. More specifically, the POS terminal 202, at step 336, will route an AUTHORIZATION TRANSACTION message to the acquirer 204. The message includes among other information, the PAN 110 (FIG. 1A) and an authorization amount equal to zero ($0.00). The message will be received by the acquirer 204, which will then simply forward it to the PPN. The PPN at step 338, will forward the received message to the issuer 224.

The issuer 224 receives the AUTHORIZATION TRANSACTION message. The issuer 224 will be alerted that the message is being sent in connection with a prepaid card in accordance with the invention based on the zero monetary amount in the AUTHORIZATION TRANSACTION message and on the specially designated BIN ("444412") contained in the extended BIN ("444412020") of the PAN that accompanies the message. The issuer 224 can then determine the load value to be $20 based on the load value 104 (FIG. 1A) contained in the extended BIN.

Figure 3B:
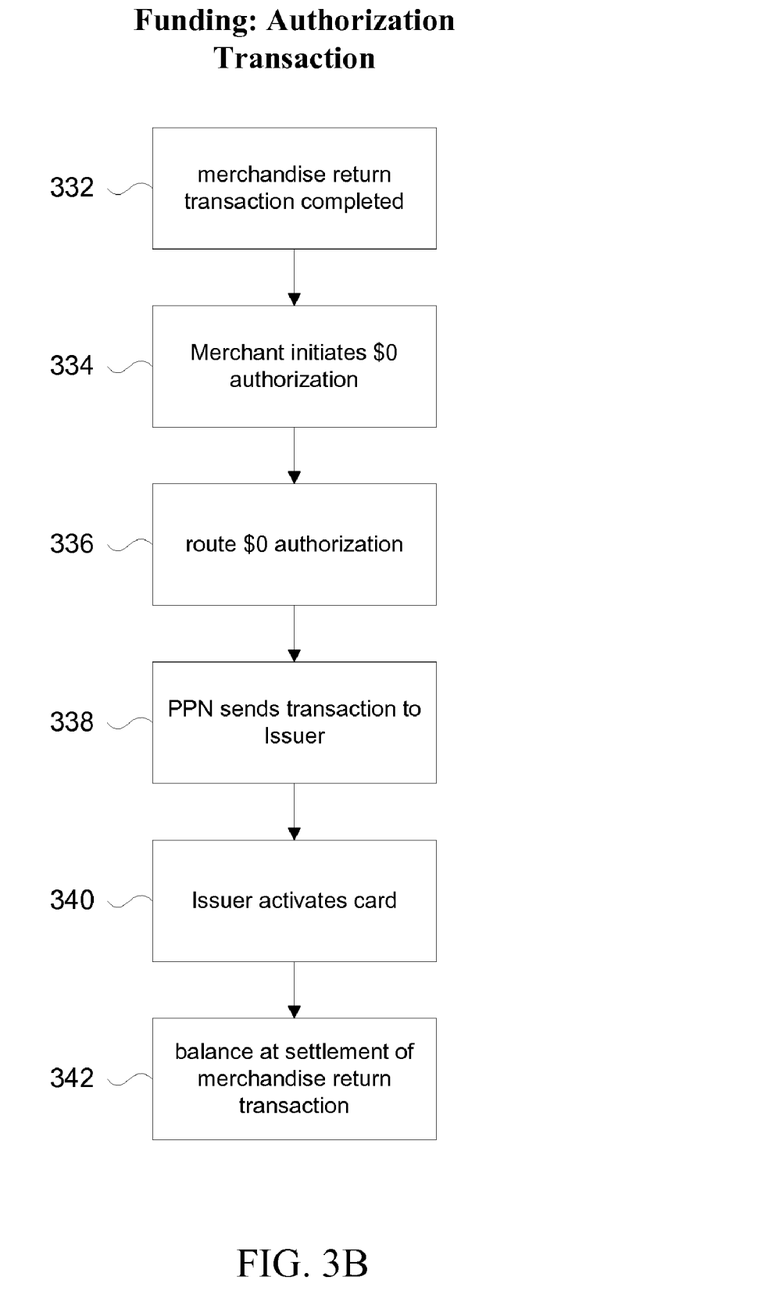

At step 340, the issuer 224 can "activate" the prepaid card in the amount of $20, thus funding the card and allowing the consumer use the card, prior to the settlement files being calculated. Credit made to the card from the zero dollar authorization transaction will subsequently be balanced with the settlement entry received for the MERCHANDISE RETURN transaction, step 342. The issuer 224 may respond to the AUTHORIZATION TRANSACTION message by sending a response (e.g., ACCEPT) that is transmitted back to the merchant 234, thus informing the merchant that the prepaid card is funded.

Figure 4A:
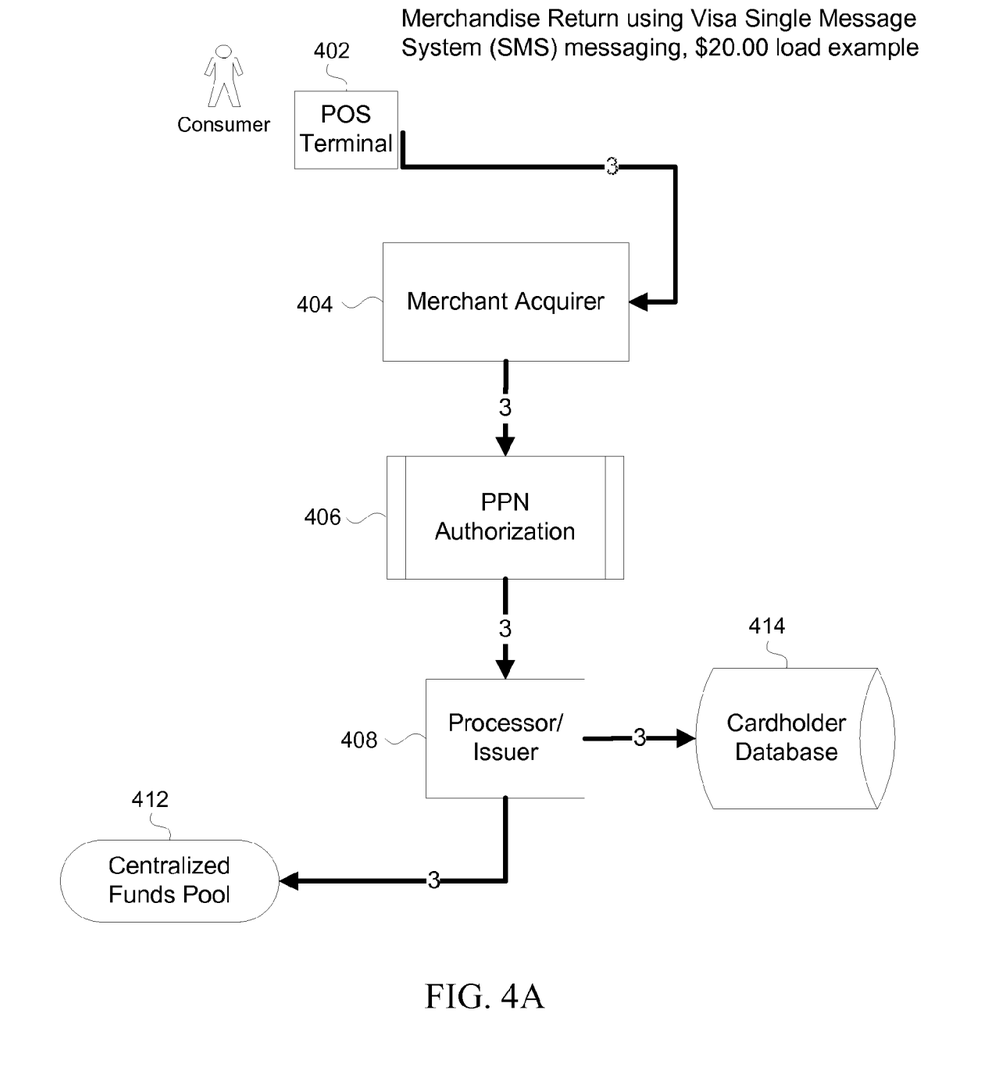
FIGS. 4A and 4B illustrate an SMS type of transaction flow in accordance with the invention.
Figure 4B:
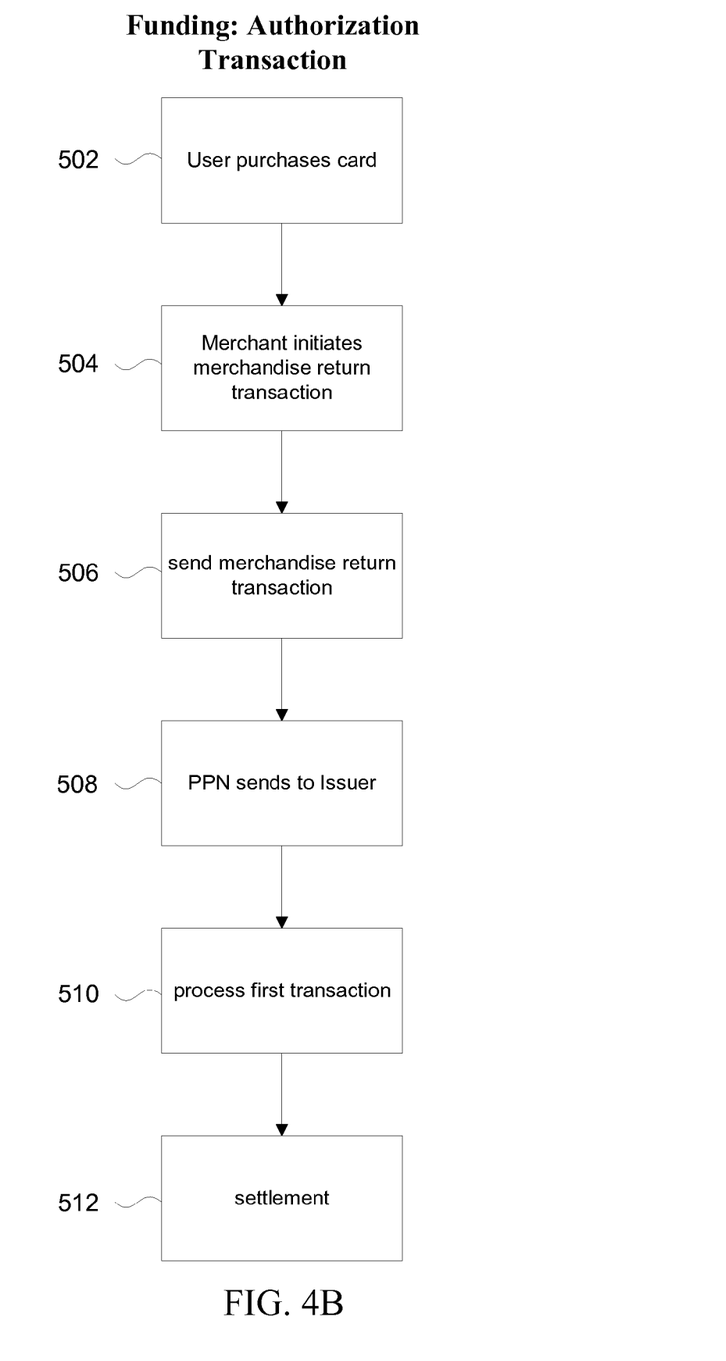

As discussed above, some acquirers settle their accounts in real-time, and for these SMS acquirers the MERCHANDISE RETURN transaction flows to the issuer in real-time. FIGS. 4A and 4B illustrate an example of an SMS flow in accordance with the invention.

The issuer 408 is notified of the card sale and funding using the MERCHANDISE RETURN transaction as follows: When a prepaid card according to the invention (e.g., FIG. 1A) is sold at step 502, the merchant 402 collects $20 from the consumer. The $20 must now be credited to the card account.

The cashier swipes or scans the card through the POS Terminal to initiate a MERCHANDISE RETURN transaction for $20, which is the amount that is to be loaded to the card, step 504. The $20 merchandise return transaction is routed (along with the extended BIN "444412020" of the PAN, FIG. 1A) to the merchant acquirer 404. The acquirer 404 then routes the transaction to the PPN, step 506. Note, that unlike the flow in FIG. 2A, there is no logging to a file. Rather, the transaction is routed in real-time to the PPN. At step 508, the PPN in turn sends the transaction in real-time to the issuer.

The issuer 408 recognizes the transaction as the first transaction on a new prepaid card that is in a non-active state, step 510. Based on the specially designated BIN of "444412", the issuer 408 is alerted to the fact that the PAN includes a load value. The issuer 408 matches the load amount to the load values designated in the PAN and ensures there is a match before approving the MERCHANDISE RETURN transaction; a mismatch results in a decline. The issuer 408 activates the card and credits the prepaid card account for the amount designated by the amount in designated the transaction, thus funding the prepaid card. The issuer 408 may respond to the MERCHANDISE RETURN transaction by sending a suitable response that is transmitted back to the merchant 402.

When settlement is calculated at step 512, the PPN determines that the acquirer settlement position is negative $20, and the issuer settlement position is positive $20. To balance this, the PPN collects $20 from the acquirer 404 and sends $20 to the issuer 408. The acquirer 404 collects $20 from the merchant 402. The merchant 402 pays the acquirer 404 the $20 that was collected from the consumer. In the end, each party involved is now balanced and $20 is now in the cardholder account.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

It will be appreciated that the prepaid cards in accordance with the invention can be funded using payment systems other than disclosed herein. For example, prepaid cards according to the invention can be used in a POS terminal adapted to provide a LOAD transaction and an ACTIVATE transaction to fund the prepaid card. Prepaid cards according to the invention are not limited to the disclosed methods insofar as how they are funded.

Embodiments of the invention have a number of advantages. Embodiments of the invention allow merchants to participate in prepaid card campaigns of selling and loading prepaid cards, even though their POS system and terminals are not configured for processing prepaid card transactions and without requiring upgrades to the payment infrastructure. Embodiments of the invention allow for the sale and real-time funding of prepaid cards by a merchant without requiring changes to the merchant acquirer system or settlement procedures.

As explained above, conventionally the card stock manufacturer prints prepaid cards with a graphic or image provided by the issuer which indicates a load value of the card. This can become difficult to manage through the sales channel if the merchant requires a large number of denominations (and hence a large number of designs). For example, if a merchant requires prepaid cards in the range of $10 to $1000 in $10 increments, that translates to 100 denominations of prepaid cards and 100 corresponding images to designate each denomination. Embodiments of the invention can simplify the distribution of large numbers of denominations by allowing the personalization bureau, rather than the card stock manufacturer, to designate the load value. This is accomplished by the personalizer, per the invention, by incorporating the load value in the PAN when the personalizer embosses the complete PAN on the prepaid card.

Embodiments of the invention can readily provide prepaid cards having arbitrary load values to facilitate a merchant's marketing efforts. This allows the merchant to easily customize an assortment of prepaid cards with load values that match the price points of its goods or services. Prepaid cards of the invention can be prepared with specific load values by the personalization bureau without having to involve the issuer or the card stock manufacturer.

Embodiments of the invention allow a merchant to quickly determine the load value of the prepaid card. In a conventional prepaid card where the load value may be represented by an image, unless the merchant was familiar with the correspondence between load value and image, or if there is no image on the prepaid card that indicated a load value, then that merchant might have to bear the cost of an authorization transaction just to confirm whether the prepaid card was of sufficient value. By comparison, a prepaid card according to the invention can be readily assessed by the merchant as to its value by looking at the load value in the PAN. Thus, if a user attempted to purchase a $100 dollar item with a card having a load value "030" in the PAN, the merchant can simply look at the PAN and refuse the sale.

Figure 5:
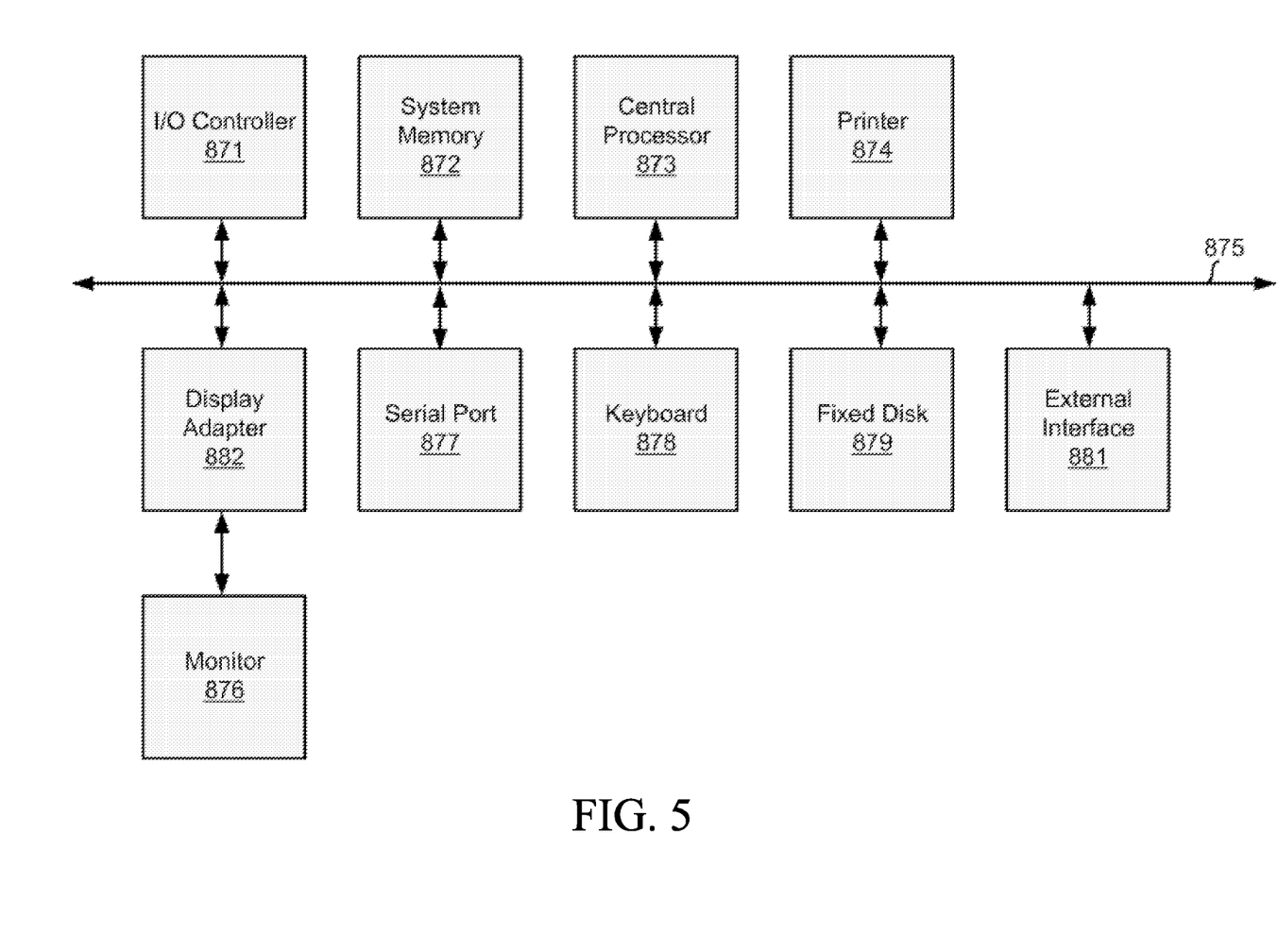
FIG. 5 illustrates a computer apparatus that can be configured to operate in accordance with the invention.

Any of the entities or components described above may include one or more of the subsystems or components shown in FIG. 5, which is a block diagram of a computer apparatus. The subsystems shown in the figure are interconnected via a system bus 875. Additional subsystems such as a printer 874, keyboard 878, fixed disk 879, monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A non-reloadable prepaid card comprising:
a substrate;
a numeric value formed on the substrate; and
a monetary value that is associated with the non-reloadable prepaid card,
the numeric value comprising a first plurality of digits identifying an issuer of the non-reloadable prepaid card, wherein a remaining portion of the numeric value includes a second plurality of digits that represents the monetary value that is associated with the non-reloadable prepaid card.

2. The card of claim 1 wherein the first plurality of digits is juxtaposed to the second plurality of digits.

3. The card of claim 2 wherein the first plurality of digits is a six digit number and the second plurality of digits is a three digit number.

4. The card of claim 1 wherein the numeric value formed on the substrate is a sixteen digit number, wherein the first plurality of digits is a six digit number and the second plurality of digits is a three digit number, wherein the first plurality of digits is positioned adjacent second the plurality of digits, wherein the remaining seven digits are adjacent the second plurality of digits.

5. A portable consumer device comprising a substrate having formed thereon a primary account number, the primary account number comprising a bank identification number, a monetary value number, a card number, and a check digit, wherein the monetary value represents a funding amount of the portable consumer device.

6. The device of claim 5 wherein the primary account number is sixteen digits in length, the monetary value and the card number consist of a total of nine digits.

7. The device of claim 6 wherein the monetary value number is three digits in length and the card number is six digits in length.

8. The device of claim 7 wherein the bank identification number is six digits in length.

9. The card of claim 5 wherein the primary account number begins with the bank identification number and wherein the bank identification number is followed directly by the monetary value number.

10. A method for loading value onto a portable consumer device comprising:
receiving a portable consumer device having formed thereon a primary account number, the primary account number comprising an identification number that identifies the issuing entity and a monetary value number, the monetary value number indicative of a funding amount with which the portable consumer device is to be funded; and
sending a merchandise return transaction message over a financial network, the merchandise return transaction message including a return amount equal to the monetary value number in the primary account number of the portable consumer device,
wherein an account associated with the portable consumer device is credited by an amount equal to the monetary value number in the primary account number of the portable consumer device.

11. The method of claim 10 wherein the account of the portable consumer device is identified by a card number portion of the primary account number of the portable consumer device.

12. The method of claim 10 further comprising receiving a return code thereby indicating to the merchant that the portable consumer device is funded.

13. The method of claim 10 further comprising the merchant receiving an amount of money from a purchaser of the first stored-value card equal to the monetary value number in the primary account number of the portable consumer device.

14. The method of claim 10 wherein the identification number is adjacent the monetary value number, and the primary account number further includes a card number portion.

15. The method of claim 10 further comprising sending an authorization request message over the financial network, the authorization request message including an authorization amount equal to zero, wherein the account associated with the portable consumer device is credited by an amount equal to the monetary value number in the primary account number subsequent to sending the authorization request message.

* * * * *